(12) United States Patent
Li

(10) Patent No.: US 10,443,779 B2
(45) Date of Patent: Oct. 15, 2019

(54) ELECTRONIC DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Gang Li, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/883,173

(22) Filed: Jan. 30, 2018

(65) Prior Publication Data

US 2018/0356025 A1    Dec. 13, 2018

(30) Foreign Application Priority Data

Jun. 7, 2017   (CN) .......................... 2017 1 0422822

(51) Int. Cl.
*F16M 11/20* (2006.01)
*G06F 3/02* (2006.01)

(52) U.S. Cl.
CPC ....... *F16M 11/2021* (2013.01); *G06F 3/0208* (2013.01); *F16M 2200/08* (2013.01)

(58) Field of Classification Search
CPC ............ F16M 11/2021; F16M 2200/08; G06F 3/0208
See application file for complete search history.

(56) References Cited

U.S. PATENT DOCUMENTS

| | | | | |
|---|---|---|---|---|
| 4,350,098 A | * | 9/1982 | Shirono ................... | H05K 7/18 108/6 |
| 4,402,624 A | * | 9/1983 | Stahl ...................... | G06F 3/0208 108/7 |
| 4,518,142 A | * | 5/1985 | Sulcek ................... | A47B 91/02 248/188.2 |
| 4,756,580 A | * | 7/1988 | Middleton, Jr. ........ | F16M 11/10 248/188.2 |
| 4,882,684 A | * | 11/1989 | Ishigami ............... | G06F 1/1615 361/679.2 |
| 5,347,424 A | * | 9/1994 | Akahane ............... | G06F 1/1616 108/117 |
| 5,541,593 A | * | 7/1996 | Arsem ................... | F16M 11/10 341/22 |
| 5,564,844 A | * | 10/1996 | Patterson, Jr. ..... | A47B 21/0314 400/492 |
| 5,687,940 A | * | 11/1997 | England ................. | A47C 3/38 248/188.2 |
| 5,732,928 A | * | 3/1998 | Chang ................... | G06F 3/0208 248/456 |

(Continued)

*Primary Examiner* — David M Sinclair
*Assistant Examiner* — Theron S Milliser
(74) *Attorney, Agent, or Firm* — McClure, Qualey & Rodack, LLP

(57) ABSTRACT

An electronic device including a base and an inclination-adjusting element is provided. The base has a receiving recess. The inclination-adjusting element is disposed within the receiving recess. The inclination-adjusting element includes a shaft and an eccentric wheel. The eccentric wheel is configured to rotate around the shaft to raise or lower the base.

11 Claims, 8 Drawing Sheets

(56) References Cited

U.S. PATENT DOCUMENTS

| | | | |
|---|---|---|---|
| 6,880,796 B2* | 4/2005 | Khor | F16C 11/10 |
| | | | 16/334 |
| 6,961,240 B2* | 11/2005 | Janicek | G06F 1/1616 |
| | | | 220/241 |
| 7,396,233 B2* | 7/2008 | Lin | F16M 11/10 |
| | | | 248/923 |
| 7,566,043 B2* | 7/2009 | Chen | G06F 1/1616 |
| | | | 248/188.2 |
| 8,348,530 B2* | 1/2013 | Tang | G06F 3/0208 |
| | | | 361/679.12 |
| 2011/0291938 A1* | 12/2011 | Wu | G06F 3/0202 |
| | | | 345/168 |
| 2013/0009526 A1* | 1/2013 | Lu | G06F 1/166 |
| | | | 312/223.1 |

* cited by examiner

ELECTRONIC DEVICE

This application claims the benefit of People's Republic of China Serial No. 201710422822.2, filed Jun. 7, 2017, the subject matter of which is incorporated herein by reference.

BACKGROUND OF THE INVENTION

Field of the Invention

The disclosure relates in general to an electronic device, and more particularly to an electronic device capable of adjusting the angle of inclination according to user's needs.

Description of the Related Art

Currently, many types of electronic devices, such as keyboard, mouse, mouse, arid touch pad, are available in the market for consumers to use. However, if a user cannot adjust these electronic devices, such as the angle of inclination, according to his/her personal habit of use, the user may feel uncomfortable over a long period of use.

In view of the above problem, it has become a prominent task for the industries to provide an electronic device capable of adjusting the angle of inclination to satisfy user's personal needs regarding the angle of inclination.

SUMMARY OF THE INVENTION

The disclosure is directed to an electronic device including an inclination-adjusting element for resolving the problem occurring to the prior art that the angle of inclination cannot be adjusted according to user's personal needs.

According to one embodiment of the present disclosure, an electronic device is provided. The electronic device includes a base and an inclination-adjusting element. The base has a receiving recess. The inclination-adjusting element is disposed within the receiving recess. The inclination-adjusting element includes a shaft and an eccentric wheel. The eccentric wheel is configured to rotate around the shaft to raise or lower the base.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

The present disclosure relates to an electronic device capable of adjusting the angle of inclination according to user's personal needs. In the embodiments, the electronic device includes an inclination-adjusting element. The inclination-adjusting element includes a shaft and an eccentric wheel. The eccentric wheel is configured to rotate around the shaft to adjust the angle of inclination of the electronic device.

It should be noted that although the present disclosure does not illustrate all possible embodiments, other embodiments not disclosed in the present disclosure are still applicable. Moreover, the dimension scales used in the accompanying drawings are not based on actual proportion of the product. Therefore, the specification and drawings are for explaining and describing the embodiment only, not for limiting the scope of protection of the present disclosure. Furthermore, descriptions of the embodiments, such as detailed structures, manufacturing procedures and materials, are for exemplification purpose only, not for limiting the scope of protection of the present disclosure. Suitable modifications or changes can be made to the structures and procedures of the embodiments to meet actual needs without breaching the spirit of the present disclosure. Designations common to the accompanying drawings are used to indicate identical or similar elements.

Figure 1:
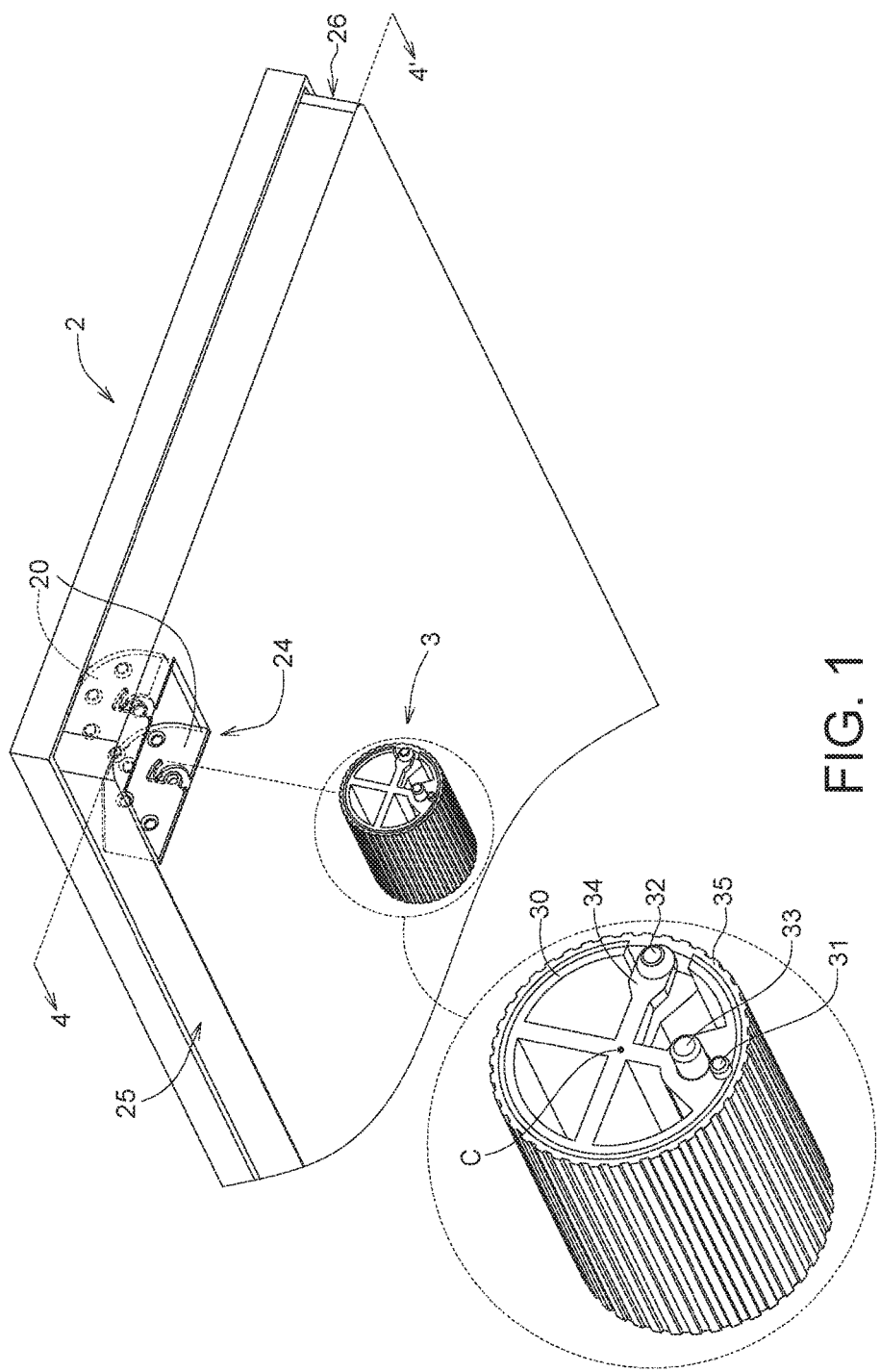
FIG. 1 is an explosion diagram of an electronic device according to one embodiment of the present disclosure.

Referring to FIG. 1, an explosion diagram of an electronic device 1 according to one embodiment of the present disclosure is shown. The electronic device 1 includes a base 2 and an inclination-adjusting element 3. The base 2 has a receiving recess 24. The inclination-adjusting element 3 is disposed within the receiving recess 24. The inclination-adjusting element 3 includes an eccentric wheel 30 and a shaft 33. The shaft 33 is disposed between two side walls 20 of the receiving recess 24. The eccentric wheel 30 does not rotate around its center C; instead, the eccentric wheel 30 rotates around the shaft 33 with respect to the side walls 20 of the receiving recess 24. Since the shaft 33 deviates from the center C of the eccentric wheel 30, the base 2 is raised or lowered and the height of the base 2 with respect to the ground is changed when the eccentric wheel 30 rotates with respect to the side walls 20 of the receiving recess 24.

For example, in one embodiment as indicated in FIG. 1, the receiving recess 24 and the inclination-adjusting element 3 are disposed on the first side 25 adjacent to the base 2, wherein the first side 25 may be the side closer to or farther away from the user. In the present example, if the first side 25 is the side farther away from the user and the electronic device 1 is placed on the desktop, the user may firstly raise the second side 26 of the base 2 and then push the electronic device 1 forward or pull the electronic device 1 backward to rotate the eccentric wheel 30. Accordingly, the height of the first side 25 of the base 2 with respect to the ground may be changed. For the convenience of describing the technical content of the present disclosure, unless specified in the following embodiments, the first side 25 is the side farther away from the user and the second side 26 is the side closer to the user.

For the user's convenience of pushing or pulling the electronic device 1, in one embodiment as indicated in FIG. 1, the inclination-adjusting element 3 may further include a sheath 35. The sheath 35 is disposed on the circumference of the eccentric wheel 30. The surface of the sheath 35 may be provided with a plurality of engraving marks for increasing the frictional force with respect to the ground so that the eccentric wheel 30 may rotate more smoothly. Furthermore, in one embodiment, the sheath 35 may be formed of a soft rubber to further increase the frictional force and prevent from skid. However, the present disclosure is not limited to above embodiments. In one embodiment, the sheath 35 may be omitted. Instead, a plurality of engraving marks may be formed on the circumference of the eccentric wheel 30 for he user's convenience of pushing or pulling the electronic device 1.

Figure 2:
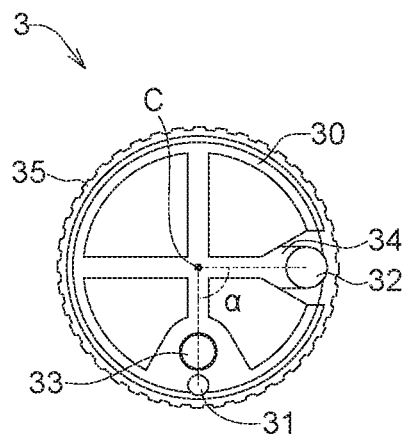
FIG. 2 is a schematic diagram of an inclination-adjusting element of the electronic device of FIG. 1.
Figure 3:
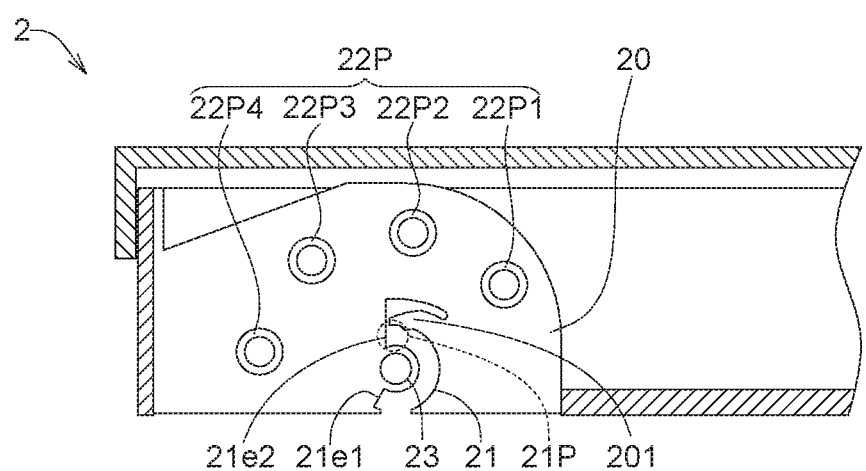
FIG. 3 is a cross-sectional view of a base of the electronic device of FIG. 1.

In one embodiment, when the eccentric wheel 30 rotates, the bumps and corresponding engaging portions for positioning may be used to enhance user's hand feelings during operation. Refer to FIGS. 1, 2 and 3. FIG. 2 is a schematic diagram of the inclination-adjusting element 3 of the electronic device 1 of FIG. 1. FIG. 3 is a cross-sectional view of the base 2 of the electronic device 1 of FIG. 1. As indicated in FIG. 1 and FIG. 2, the eccentric wheel 30 may include a first bump 31. The first bump 31 is adjacent to the shaft 33 and disposed on the eccentric wheel 30. As indicated in FIG. 3, the side wall 20 of the receiving recess 24 may have a guide rail 21. The guide rail 21 has a first end 21e1 and a second end 21e2. The second end 21e2 has a first engaging portion 21P. When the shaft 33 passes through the hole 23 on the side wall 20 so that the eccentric wheel 30 is disposed within the receiving recess 24, the first bump 31 is located within the guide rail 21. Moreover, when the eccentric wheel 30 rotates, the first bump 31 may move within the guide rail 21. The side wall 20 further has a deformable cantilever 201. Therefore, the first bump 31 may further be selectively engaged with or detached from the first engaging portion 21P through the deformation of the side wall 20.

Figure 4A:
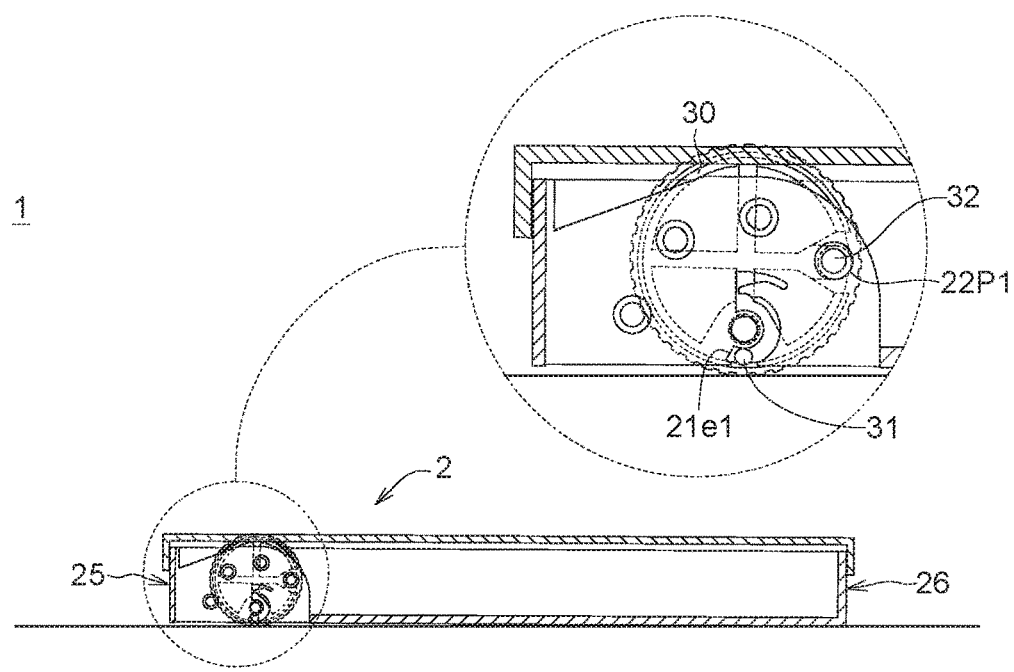
FIGS. 4A-4E are cross-sectional views of the electronic device of FIG. 1 along a cross-sectional line 4-4' at different angels of inclination.

Referring to FIG. 4A, a cross-sectional view of the electronic device of FIG. 1 along a cross-sectional line 4-4' when the first side 25 of the base 2 of FIG. 1 is at a lowest position is shown. When the first side 25 of the base 2 is located at the lowest position, the first bump 31 is located at the first end 21e1 of the guide rail 21. At this time, even the user raises the second side 26 of the base 2 and pulls it to the right-hand side of the drawing, the eccentric wheel 30 cannot rotate since the first bump 31 is restricted by the first end 21e1. Therefore, the user may be aware that the first side 25 of the base 2 is at the lowest position.

Figure 4B:
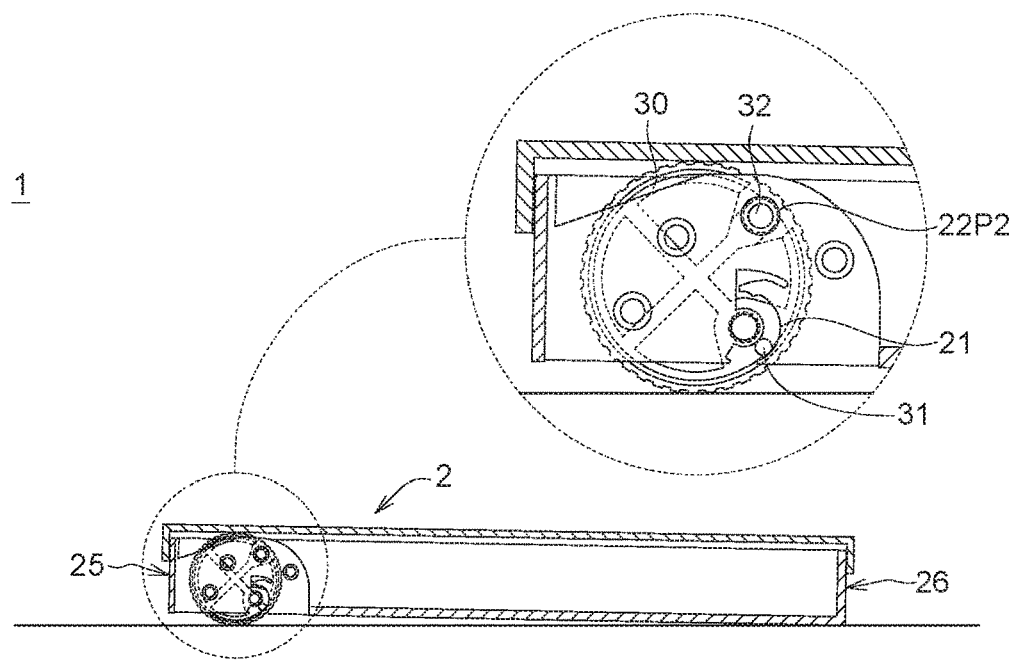
Figure 4C:
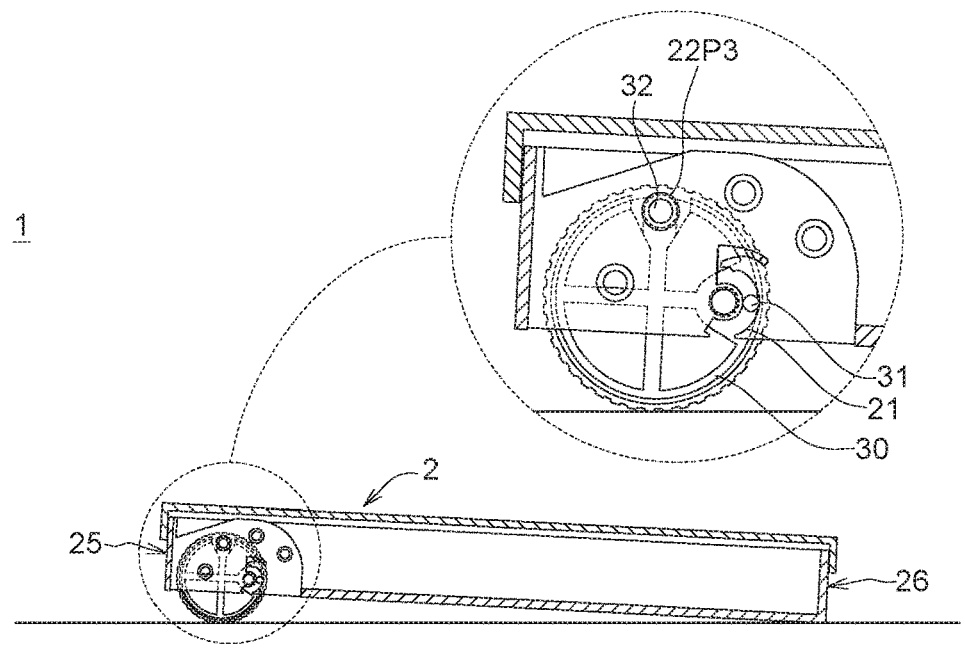
Figure 4D:
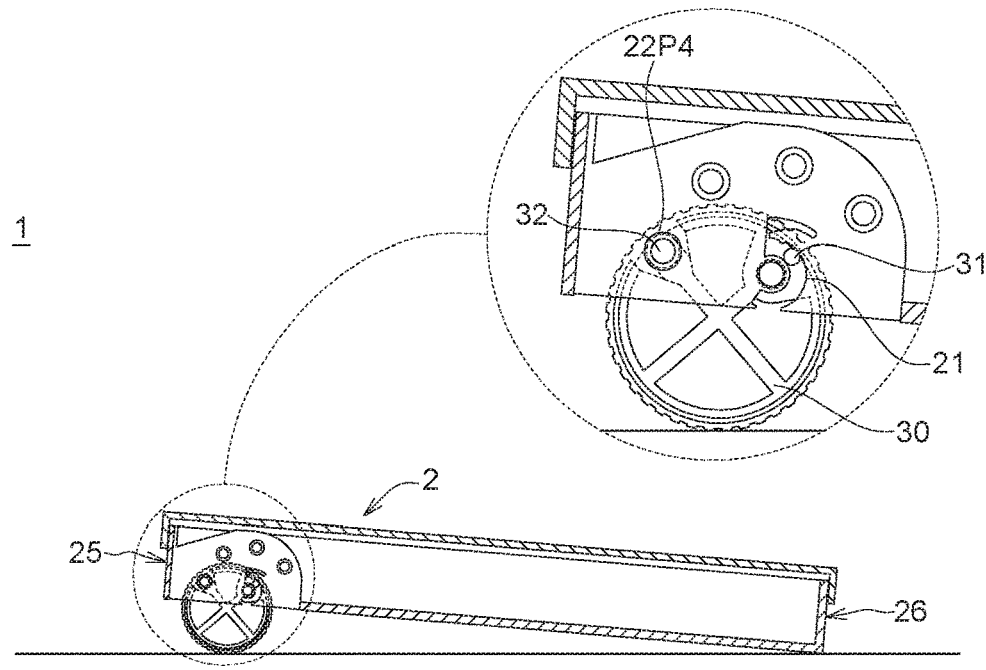
Figure 4E:
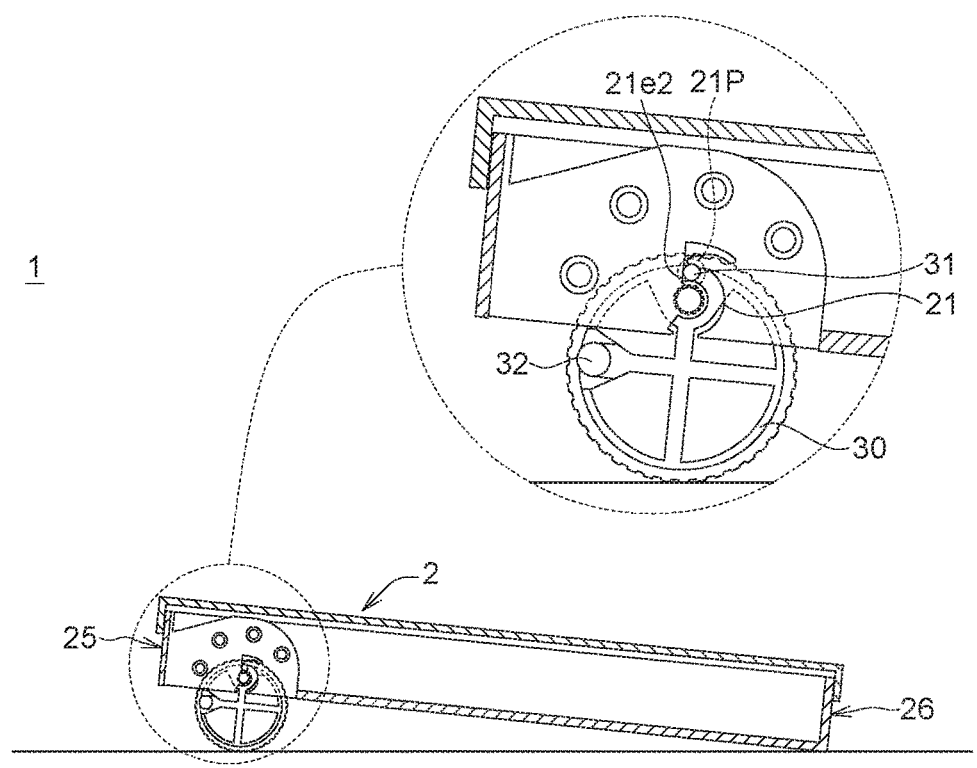

Referring to FIG. 4E, a cross-sectional view of the electronic device of FIG. 1 along a cross-sectional line 4-4' when the first side 25 of the base 2 of FIG. 1 is at a highest position is shown. In the present example, the first engaging portion 21P is disposed at the second end 21e2 of the guide rail 21. When the user raises the second side 26 of the base 2 of FIG. 4A and pushes it to the left-hand side of the drawing, the first bump 31 may move within the guide rail 21. When the first bump 31 moves to the second end 21e2 of the guide rail 21 and the first bump 31 is engaged with the first engaging portion 21P, the user may be aware that the first side 25 of the base 2 is already adjusted to the highest position.

Although the first engaging portion 21P as shown in FIG. 3 or 4E is disposed at the second end 21e2 of the guide rail 21, the present disclosure is not limited thereto. The first engaging portion 21P may be disposed at any position of the guide rail 21 according to the needs. For example, the first engaging portion 21P may be disposed at any position between the first end 21e1 and the second end 21e2 of the guide rail 21.

Moreover, the quantity of first engaging portions 21P is not limited to one. Instead, a plurality of first engaging portions 21P may be disposed between the first end 21e1 and the second end 21e2 of the guide rail 21. For example, more than two first engaging portions 21P may be disposed between the first end 21e1 and the second end 21e2 of the guide rail 21. Thus, the user may be aware that the first side 25 of the base 2 may be adjusted to shift among more than three shift stages. That is, the base 2 has more than three different inclination adjustments.

Furthermore, in one embodiment, a second bump 32 and corresponding second engaging portions 22P may be used to facilitate positioning and enhance user's hand feelings during operation. Refer to FIG. 1, FIG. 2 and FIG. 3. The eccentric wheel 30 may further include a second bump 32 and a flexible cantilever 34. The flexible cantilever 34 extends towards the circumference from the center of the eccentric wheel 30. The second bump 32 is disposed at one end of the flexible cantilever 34. The side wall 20 of the receiving recess 24 may have a plurality of second engaging portions 22P. Each of the second engaging portions 22P may be a hole whose shape matches with the shape of the second bump 32. While the base 2 is raised to the highest position from the lowest position, the second bump 32 may be selectively engaged with or detached from one of the second engaging portions 22P through the deformation of the flexible cantilever 34.

The second bump 32 is not necessarily engaged with or detached from the second engaging portions 22P through the deformation of the flexible cantilever 34. In some embodiments, the flexible cantilever 34 may be omitted, and the second bump 32 is itself an elastic bump, such as a pogo pin. Therefore, the second bump 32 may be engaged with or detached from the second engaging portions 22P through the elastic deformation of the second bump 32 itself.

Furthermore, the second engaging portions 22P is not necessarily a hole whose shape matches with that of the second bump 32. In some embodiments, the structure of the second engaging portion 22P may be similar to that of the first engaging portion 21P. That is, the second engaging portion 22P may be an engaging portion formed through the deformation of the side wall 20.

Refer to FIG. 2 and FIG. 3. A central angle a between the first bump 31 and the second bump 32 is 90 degrees. However, the present disclosure is not limited thereto, and the central angle between two bumps may be adjusted according to actual needs. In the present embodiment, the side wall 20 has four second engaging portions 22P1, 22P2, 22P3, and 22P4, and the base 2 may have five different inclination adjustments.

At an initial state as indicated in FIG. 4A, when the first side 25 of the base 2 is located at a lowest position, the first bump 31 is located at the first end 21e1 of the guide rail 21 and the second bump 32 is engaged with the second engaging portion 22P1. This state is the first inclination adjustment of the base 2.

Then, the user may raise the second side 26 of the base 2 of FIG. 4A and push it to the left-hand side of the drawing. At this time, the second bump 32 may be detached from the second engaging portion 22P1 through the deformation of the flexible cantilever 34, and the eccentric wheel 30 may rotate counterclockwise. In the state as indicated in FIG. 4B, the first bump 31 is located within the guide rail 21, and the second bump 32 is engaged with the second engaging portion 22P2, such that the user may be aware that the shift adjustment of the base 2 has been finished. In addition, when the eccentric wheel 30 rotates, the base 2 may be raised and the height of the base 2 with respect to the ground may be changed. The state of FIG. 4B is the second inclination adjustment of the base 2.

Then, the user may again raise the second side 26 of the base 2 of FIG. 4B and pushes it to the left-hand side of the drawing. At this time, the second bump 32 may be detached from the second engaging portion 22P2 through the deformation of the flexible cantilever 34, and the eccentric wheel 30 may rotate counterclockwise. In the state as indicated in FIG. 4O, the first bump 31 is located within the guide rail 21, and the second bump 32 is engaged with the second engaging portion 22P3, such that the user may be aware that the shift adjustment of the base 2 has been finished. In addition, when the eccentric wheel 30 rotates, the base 2 may be further raised and the height of the base 2 with respect to the ground may be changed again. The state of FIG. 4O is the third inclination adjustment of the base 2.

Then, the user may again raise the second side 26 of the base 2 of FIG. 4O and push it to the left-hand side of the drawing. At this time, the second bump 32 may be detached from the second engaging portion 22P3 through the deformation of the flexible cantilever 34, and the eccentric wheel 30 may rotate counterclockwise. In the state as indicated in FIG. 4O, the first bump 31 is located within the guide rail 21, and the second bump 32 is engaged with the second engaging portion 22P4, such that the user may be aware that the shift adjustment of the base 2 has been finished. In addition, when the eccentric wheel 30 rotates, the base 2 may be further raised and the height of the base 2 with respect to the ground may be changed again. The state of FIG. 4D is the fourth inclination adjustment of the base 2.

Then, the user may again raise the second side 26 of the base 2 of FIG. 4D and push it to the left-hand side of the drawing. At this time, the second bump 32 may be detached from the second engaging portion 22P4 through the deformation of the flexible cantilever 34, and the eccentric wheel 30 may rotate counterclockwise. In the state as indicated in FIG. 4E, the second bump 32 is detached from all of the second engaging portions 22P1, 22P2, 22P3, 22P4, but the first bump 31 is immediately engaged with the first engaging portion 21P, such that the user may still be aware that the shift adjustment of the base 2 has been finished. Moreover, since the eccentric wheel 30 rotates about 180° from the state of FIG. 4A to the state of FIG. 4E, the height of the base 2 with respect to the ground has been adjusted to the highest position. This state is the fifth inclination adjustment of the base 2.

As indicated in FIGS. 4A-4E, the eccentric wheel 30 includes the first bump 31, the second bump 32 and corresponding engaging portions used to facilitate positioning and enhance user's hand feelings during operation. However, the present disclosure is not limited thereto. Although the eccentric wheel 30 does not have the these bumps and engaging portions, or the eccentric wheel 30 only has the first bump 31 and corresponding engaging portions, or the eccentric wheel 30 only has the second bump 32 and corresponding engaging portions, the electronic device may still realize inclination adjustment.

For example, when the eccentric wheel 30 only has the second bump 32 and corresponding engaging portions, the five different inclination adjustments may be realized by changing the position of the second bump 32 on the eccentric wheel 30 to avoid the second bump 32 being detached from the second engaging portion 22P when the base 2 is adjusted to the highest position. For example, the central angle α (illustrated in FIG. 2) between the second bump 32 and the shaft 33 may be adjusted to be less than 90 degrees. Thus, the five second engaging portions 22P may all be disposed on the side wall 20, and the user may still be aware that the base 2 may be adjusted to shift among five different shift stages. In addition, the shift adjustments among these shift stages may be more accurately positioned through corresponding bumps and engaging portions.

Figure 5A:
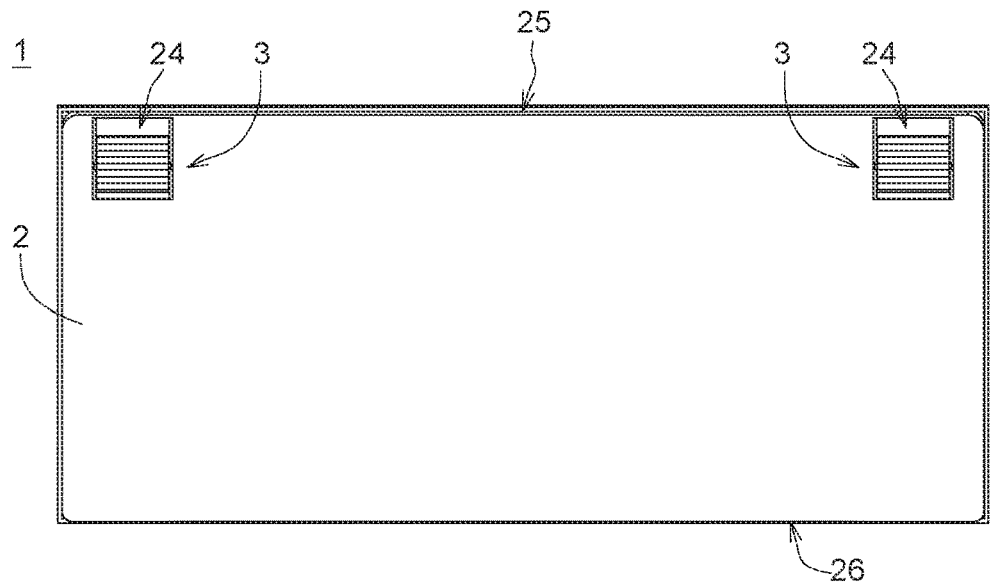
FIGS. 5A-5D are schematic diagrams of electronic devices according to different embodiments of the present disclosure.
Figure 5B:
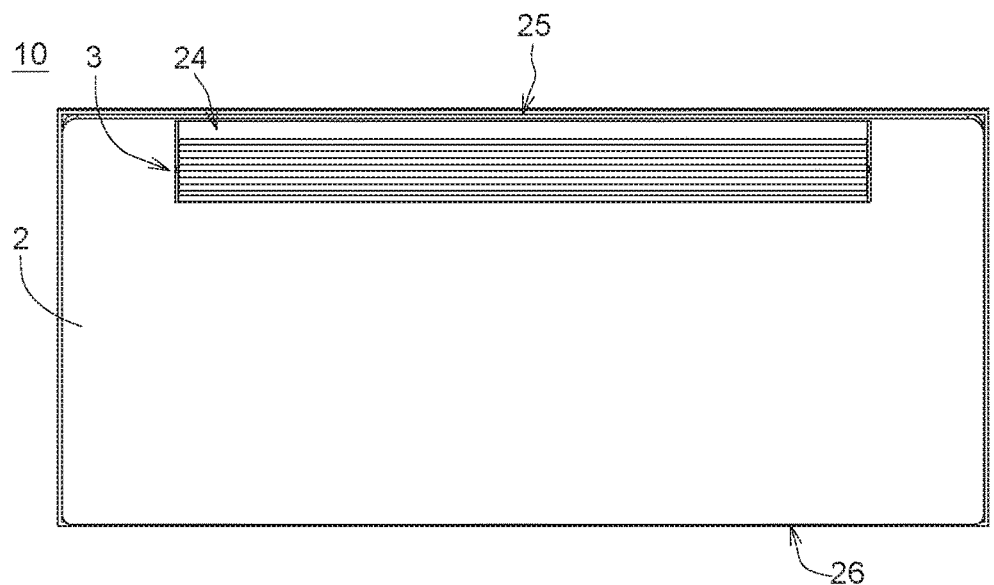

Furthermore, the receiving recess 24 arid the inclination-adjusting element 3 may be disposed in the electronic device in different ways according to needs. Referring to FIGS. 5A-5D, schematic diagrams of electronic devices 1, 10, 1', and 10' according to different embodiments of the present disclosure are shown. As indicated in FIG. 5A, the first side 25 of the base 2 may have two sets of the receiving recess 24 and the inclination-adjusting element 3. Or, in another embodiment as indicated in FIG. 5B, the first side 25 of the base 2 may have only one set of the receiving recess 24 and the inclination-adjusting element 3. Thus, while the eccentric wheel (not illustrated) starts to rotate from an initial state, the first side 25 may be gradually raised so that the user may select an angle of inclination that suits his/her personal needs best.

Figure 5C:
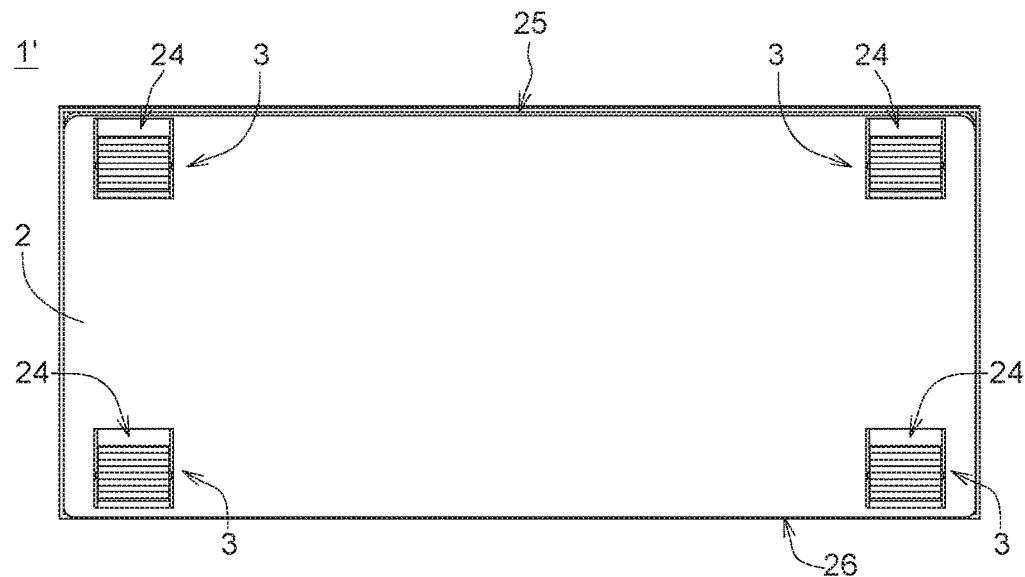
Figure 5D:
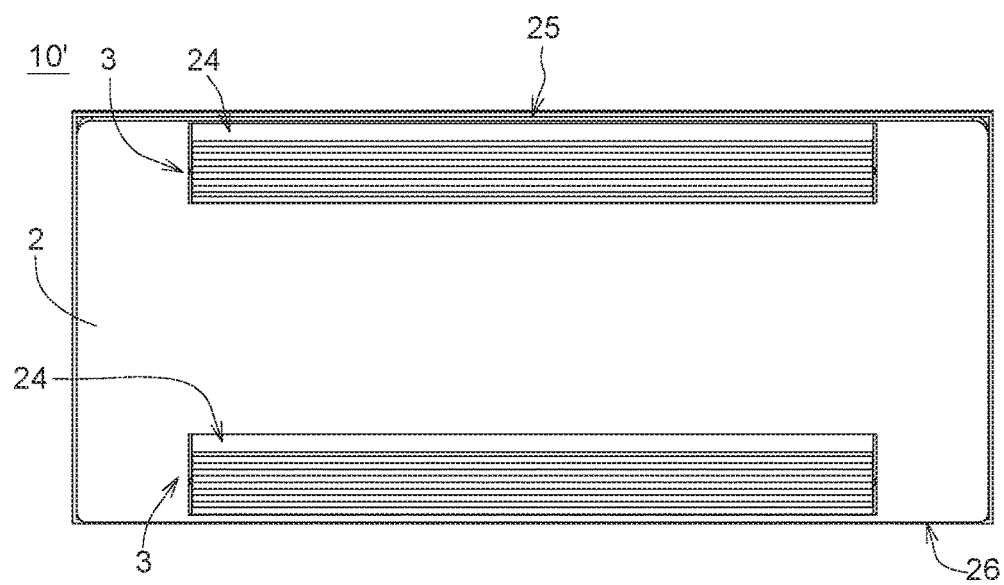

In another embodiment as indicated in FIG. 5C, the first side 25 and the second side 26 of the base 2 may respectively have two sets of the receiving recess 24 and the inclination-adjusting element 3. Or, in another embodiment as indicated in FIG. 5D, the first side 25 and the second side 26 of the base 2 may respectively have one set of the receiving recess 24 and the inclination-adjusting element 3. Thus, the height of the first side 25 and the height of the second side 26 of the base 2 may be adjusted independently and step by step. For example, if the user wants to put his/her hand on the electronic device 1' or 10', the user may adjust the height of the second side 26 so that his/her wrist may be placed with comfort. Or, the user may firstly adjust the height of the first side 25 and then adjust the height of the second side 26 to select an angle of inclination that suits his/her personal needs best.

The electronic devices 1, 10, 1', and 10' provided above may be, for example, a keyboard, a mouse, a projector, a touch pad, a drawing board or a display stand. For example, if each of the electronic devices 1, 10, 1', and 10' is a mouse, the inclination-adjusting element 3 may be disposed on one side of the bottom of the mouse. By adjusting the inclination-adjusting element 3 disposed on that side, different angles of inclination may immediately be obtained. However, the present disclosure is not limited to above exemplifications.

Figure 6A:
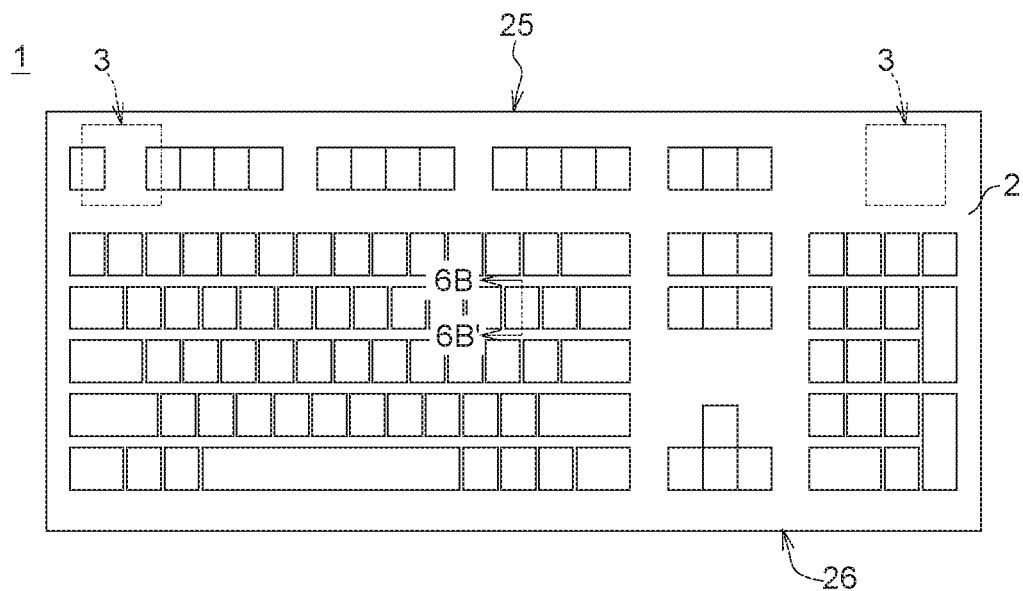
FIG. 6A is a schematic diagram of an electronic device according to one embodiment of the present disclosure.

FIG. 6A is a schematic diagram of an electronic device 1 according to one embodiment of the present disclosure. The electronic device 1 may be a keyboard. Here, the inclination-adjusting element 3 may be disposed on the first side 25 of the base 2. By adjusting the height of the first side 25, the user may find an angle of inclination that suits his/her personal needs best.

The electronic device 1 of FIG. 6A may be, for example, a light-emitting keyboard, so that user may clearly recognize the press key of the keyboard in an environment lacking sufficient illumination. Normally, the press key of a light emitting keyboard may include a light-emitting module, such as a light-emitting diode (LED) module. However, ordinary light emitting module inevitably raises concern about light leakage.

Figure 6B:
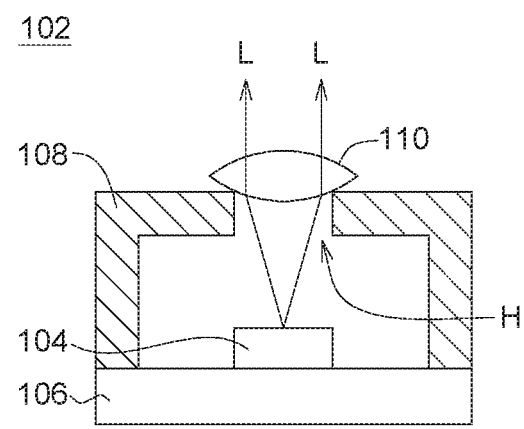
FIG. 6B is a cross-sectional view of the electronic device of FIG. 6A along a cross-sectional line 6B-6B'.

FIG. 6B is a cross-sectional view of the electronic device 1 of FIG. 6A along a cross-sectional line 6B-6B'. For the convenience of description, FIG. 6B only illustrates a cross-sectional view of a light-emitting module 102 and omits other structures. Refer to FIG. 6B. A light-emitting unit 104, which may be a light-emitting diode, is disposed on the thin-film circuit board 106. A mask 108 is disposed on the thin-film circuit board 106 and covers the light-emitting unit 104. The mask 108 has an opening region H through which light L emitted from the light-emitting unit 104 exits. Besides, a condenser lens 110 may further be disposed above the opening region H. Therefore, when the light L reaches the opening region H, the condenser lens 110 may converge the light L and change its divergent angle. Thus, the light leakage phenomenon resulting from the larger divergent angle of the light L may be resolved.

The electronic device provided above is capable of adjusting the angle of inclination according to user's personal needs, and is easy to operate. The electronic device includes an eccentric wheel. When the eccentric wheel rotates around the shaft, the height of the shaft with respect to the ground continuously changes, so the base may be raised or lowered. Thus, the inclination adjustment is very simple to the user. The user only needs to raise one side of the base and then push it forwards or pull it backwards, the inclination adjustment at different angles may be immediately finished. In one embodiment, the circumference of the eccentric wheel may have a plurality of engraving marks. In another embodiment, the inclination-adjusting element further includes a sheath disposed on the circumference of the eccentric wheel. The surface of the sheath has a plurality of engraving marks for the user's convenience of pushing or pulling the electronic device.

In some embodiments, the bumps and corresponding engaging portions for positioning may be used to enhance the user's hand feelings during operation. Since the above structures may be directly formed by one injection of plastics and there is no need to add any positioning structures, the manufacturing cost may be reduced.

For example, in some embodiments, the eccentric wheel may only include a first bump and corresponding first engaging portion, and the quantity of first engaging portion may be one or more than one. When the eccentric wheel rotates, the first bump may be selectively engaged with or detached from the first engaging portion to perform the adjustment among two or more than two shift stages. In one embodiment, the first bump may be selectively engaged with or detached from the first engaging portion through the deformation of the side wall.

Or, in some embodiments, the eccentric wheel may only include a second bump and corresponding second engaging portion, and the quantity of the second engaging portion may be plural. When the eccentric wheel rotates, the second bump may be selectively engaged with or detached from one of the second engaging portions to perform the adjustment among a plurality of shift stages. In one embodiment, the second bump is disposed on a flexible cantilever and may be selectively engaged with or detached from one of the second engaging portions through the deformation of the flexible cantilever. In another embodiment, the second bump, being an elastic bump, may be selectively engaged with or detached from the second engaging portions through the elastic deformation of the second bump. In an alternate embodiment, the second bump may be selectively engaged with or detached from one of the second engaging portions through the deformation of the side wall.

Or, in some embodiments, the eccentric wheel may include a first bump, a second bump and corresponding engaging portions used to facilitate positioning and enhance the user's hand feelings during operation. In one embodiment, when the base is moved to the highest position, the second bump is detached from all of the second engaging portions but the first bump is immediately engaged with the first engaging portion, so that the user may still be aware that the shift adjustment of the base has been finished.

Also, in some embodiments, the receiving recess and the inclination-adjusting element may be disposed in the electronic device in various ways according to needs. For example, the receiving recess and the inclination-adjusting element may be disposed on the first side adjacent to the base, the second side, or both the first side and the second side for the user to select an angle of inclination that suits his/her personal needs best. In addition, there may be one or more than one set of the receiving recess and the inclination-adjusting element.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device comprising:
a base having a receiving recess, a side wall of the receiving recess having a guide rail and a plurality of second engaging portions, the guide rail having a first engaging portion; and
an inclination-adjusting element disposed within the receiving recess and comprising:
a shaft; and
an eccentric wheel configured to rotate around the shaft to raise or lower the base,
and comprising a first bump and a second bump, the first bump adjacent to the shaft and disposed in the guide rail;
wherein when the base is raised to a highest position, the second bump is detached from all of the second engaging portions and located at a position lower than the base, and the first bump is engaged with the first engaging portion to fix the shaft.

2. The electronic device according to claim 1, wherein when the eccentric wheel rotates, the first bump is selectively engaged with or detached from the first engaging portion.

3. The electronic device according to claim 2, wherein the guide rail has a plurality of first engaging portions, and when the eccentric wheel rotates, the first bump is selectively engaged with or detached from one of the first engaging portions.

4. The electronic device according to claim 1, wherein while the base is raised to the highest position from a lowest position, the second bump is selectively engaged with or detached from one of the second engaging portions.

5. The electronic device according to claim 1, wherein the eccentric wheel further comprises a flexible cantilever extending towards a circumference of the eccentric wheel from a center of the eccentric wheel, and the second bump is disposed at one end of the flexible cantilever.

6. The electronic device according to claim 1, wherein a central angle between the second bump and the first bump is 90 degrees.

7. The electronic device according to claim 1, wherein the inclination-adjusting element further comprises a sheath disposed on a circumference of the eccentric wheel, and a plurality of engraving marks is disposed on a surface of the sheath.

8. The electronic device according to claim 7, wherein the sheath is formed of a soft rubber.

9. The electronic device according to claim 1, wherein the receiving recess and the inclination-adjusting element are disposed on a first side of the base, and the inclination-adjusting element is configured so that the first side is raised gradually while the eccentric wheel rotates.

10. The electronic device according to claim 1, further comprising at least two sets of the receiving recess and the inclination-adjusting element, wherein the two sets are respectively disposed on a first side and a second side opposite to the first side of the base.

11. The electronic device according to claim 1, wherein the electronic device is a keyboard, a mouse, a projector, a touch pad, a drawing board or a display stand.

* * * * *